J. HANSON.
CAKE TURNER.
APPLICATION FILED JUNE 30, 1916.
1,219,818.
Patented Mar. 20, 1917.
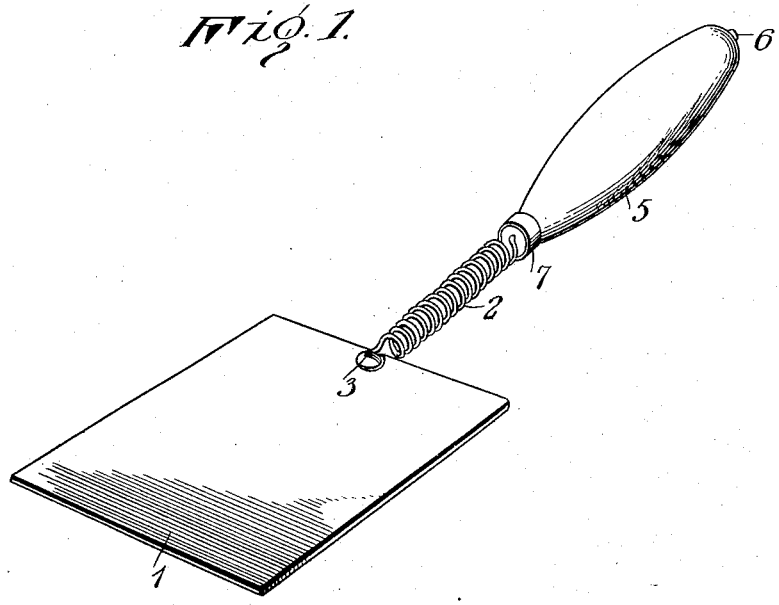
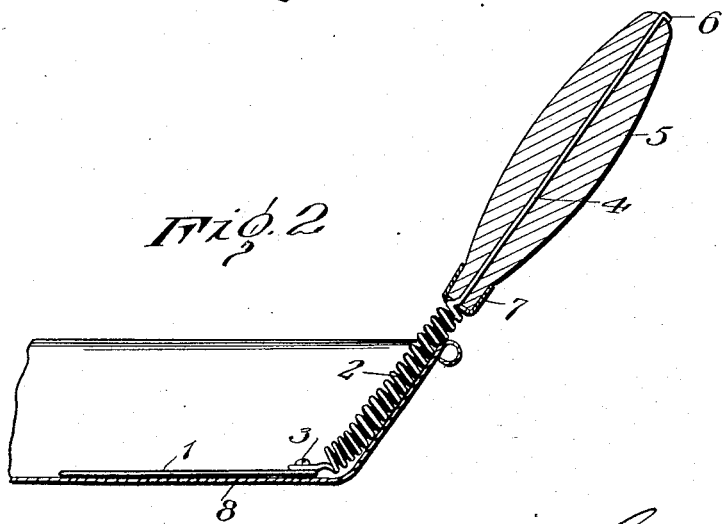
John Hanson,
Inventor
By Geo. P. Kimmel
Attorney

UNITED STATES PATENT OFFICE.

JOHN HANSON, OF STEELE, NORTH DAKOTA.

CAKE-TURNER.

1,219,818.  Specification of Letters Patent.  Patented Mar. 20, 1917.

Application filed June 30, 1916. Serial No. 106,888.

*To all whom it may concern:*

Be it known that I, JOHN HANSON, a citizen of the United States, and resident of Steele, in the county of Kidder and State of North Dakota, have invented certain new and useful Improvements in Cake-Turners, of which the following is a specification.

The present invention relates to kitchen and table articles and has particular reference to new and useful improvements in cake turners.

The primary object of my invention is to provide a cake turner of the class described having a new and improved arrangement of the blade and handle and connecting means therefor whereby to enhance the efficiency and facilitate the use of such devices.

Another object of my invention is to provide a resilient connecting means for use between the handle and blade of a cake turner for permitting distortion of the blade relative to the handle when the device is in use.

Another object of my invention is to provide a cake turning device of the class described which is simple in construction, strong and durable and effective in operation.

Other objects and advantages to be derived from the use of my improved cake turner will appear from the following detail description and the claim, taken with an inspection of the accompanying drawing, in which:

Figure 1 is a perspective view of a cake turner embodying the improvements of my invention; and Fig. 2 is a side elevational view of the same, the handle being shown in section and the device being shown in use.

Referring more particularly to the drawing, wherein similar characters of reference designate like and corresponding parts throughout the various views, 1 designates the blade of my improved cake turner, said blade, in the present instance, being rectangular in configuration. Of course, any configuration of blade may be employed. The flexible connecting means referred to hereinbefore includes a coil spring element 2 riveted or otherwise secured as at 3 at one end of said blade 1.

The free end of the coil spring element 2 is extended to provide a straight portion 4 adapted to receive a handle 5 formed of wood or some similar heat insulating material. The free end of the straight portion 4 is bent as at 6 to engage the handle 5 and prevent displacement of the same. A ferrule 7 is mounted on the inner end of the handle for an obvious purpose. Preferably, the coil spring element at its outer end abuts the ferrule so as to prevent movement of the handle on the straight portion 4.

In use it will seen that by the provision of the spring portion 3 I afford means for facilitating the engagement of the blade 1 under a cake or the like when being cooked in a pan. In Fig. 2 I have shown one use of the device, the same being applied to the bottom of the pan designated 8. The coil spring 2 is shown flexed in this figure. Preferably the coil spring element is of such strength as to normally support a relatively heavy object on the blade without bending, but the strength of the spring should be such as to permit flexing without much effort on the part of the user. Thus, it will be seen that in using my improved cake turner objects in course of cooking are rendered accessible which would ordinarily not be accessible or could not be reached without considerable difficulty.

From the above description taken in connection with the accompanying drawing, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus fully described my invention, what I claim as new and desire to secure by Letters Patent, is:

A cake turner having a blade, a coil spring element having one end thereof connected to said blade, the other end of said spring element being provided with a straight portion, a handle mounted on said straight portion, and the free end of said portion being laterally bent to prevent displacement of said handle.

In testimony whereof, I affix my signature hereto.

JOHN HANSON.

Copies of this patent may be obtained for five cents each, by addressing the "Commissioner of Patents, Washington, D. C."